3,528,969
Patented Sept. 15, 1970

3,528,969
BENZYLIDENE HYDRAZONES
William J. Houlihan and Robert E. Manning, Mountain Lakes, N.J., assignors to Sandoz-Wander, Inc., a corporation of Delaware
No Drawing. Filed Nov. 30, 1967, Ser. No. 686,818
Int. Cl. C07d 51/76
U.S. Cl. 260—240                2 Claims

ABSTRACT OF THE DISCLOSURE

This disclosure pertains to dichlorobenzylidene hydrazones substituted with a pyridazinyl group, e.g., 2,6-dichlorobenzaldehyde - 2 -(3-chloro - 4-diallylaminopyridazine-6-yl)-hydrazone. These compounds are useful as hypotensives.

---

This invention relates to novel heterocyclic compounds. In particular, this invention pertains to benzylidene hydrazones containing a pyridazinyl moiety. This invention also relates to processes for preparing the novel compounds.

The benzylidene hydrazones of this invention may be represented by the following structural formula:

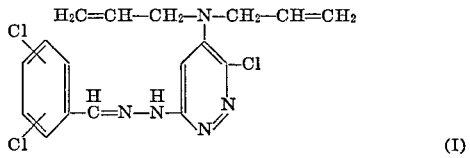

(I)

The compounds of Formula I may be prepared by treating in solvent a dichlorobenzaldehyde of the formula

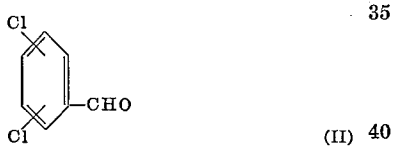

(II)

with 3-chloro-4-diallylamino-6-hydrazinopyridazine (III) or an acid addition salt thereof.

In accordance with the above process, the compounds of Formula I are prepared by treating the benzaldehydes of Formula II with the free base or acid salt of the substituted pyridazine of Formula III in solvent such as alcohols, e.g., lower alkanols such as ethanol, isopropanol and the like. The reaction may be carried out at a temperature of from about 75° C.–150° C., preferably the reflux temperature of the reaction mixture, for about 8–48 hours. The particular solvent and temperatures used are not critical to the successful completion of the reaction. The substituted pyridazine acid addition salts which may be used include the strong mineral acid addition salts, e.g., the hydrogen halides such as the hydrogen chloride, hydrogen iodide or hydrogen bromide, and the like. The resulting product is readily recovered by conventional techniques, e.g., filtration. When the product is recovered as an acid addition salt, it may be converted to the free base by standard techniques.

The compound of Formula III is prepared by treating 3,4,6-trichloropyridazine with diallylamine to obtain 3,6-dichloro-4-diallylaminopyridazine, and treating the latter with hydrazine. Diallylamine and 3,4,6-trichloropyridazine are known compounds prepared as described in the literature. Some of the aldehydes of Formula II are known, and may be prepared according to methods disclosed in the literature. Those componds of Formula II not specifically disclosed may be prepared from known materials using analogous methods.

The compounds represented by Formula I above are useful because they possess pharmaceutical properties in animals. In particular, these compounds are useful as hypotensives, as indicated by their activity in anesthetized dog tested by blood pressure measurement using a mercury manometer or transducer via a catheter inserted in the carotid or femoral artery. When so utilized, the compounds may be combined with one or more pharmaceutically acceptable carriers or adjuvants. They may be administered orally or parenterally and, depending upon the compound employed and the mode of administration, the exact dosage utilized may vary.

Furthermore, these compounds I may be similarly administered in the form of their non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like. In general, satisfactory results are obtained when these compounds are administered at a daily dosage of about 0.1 milligrams to about 20 milligrams per kilogram of animal body weight. This daily dosage is preferably administered 2 to 4 times a day, or in sustained release form. For most large mammals such as primates, the total daily dosage is from about 10 milligrams to about 450 milligrams. Dosage forms suitable for internal use comprise from about 2.5 milligrams to about 225 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by wt. |
|---|---|
| 2,6-dichlorobenzaldehyde-2-(3 - chloro - 4 - diallylaminopyridazin-6-yl)-hydrazone hydrochloride | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

2,6-dichlorobenzaldehyde-2-(3-chloro-4-daillylaminopyridazin-6-yl) hydrazone hydrochloride

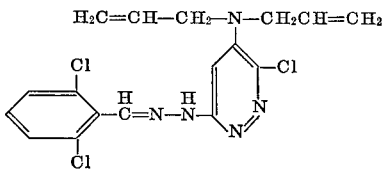

A mixture of 2,6-dichlorobenzaldehyde (2.0 g. and 3-chloro-4-diallylamino - 6 - hydrazinopyridazine dihydrochloride (3.1 g.) in ethanol (30 ml.) is stirred at room temperature for 4 hours. The resultant solid is collected by filtration to afford 4.0 g. of material; M.P. 193–202° C. with decomposition.

Recrystallization from methanol-ether (1:2) gives 3.0 g. of 2,6 - dichlorobenzaldehyde - 2 - (3-chloro-4-dialkylaminopyridazin-6 - yl) - hydrazone hydrochloride; M.P. 195°–204° C., with decomposition.

EXAMPLE 2

3-chloro-4-diallylamino-6-hydrazinopyridazine

To a flask equipped with a stirrer and condenser is added 800 ml. of absolute ethanol, 60 g. (0.33 mole) of 3,4,6-trichloropyridazine, and 94 g. (0.97 mole) of diallylamine. The mixture is stirred and refluxed for 25 hours and poured into 400 ml. of water. Sodium hydroxide (50% is added until the pH is 10.0. The mixture is extracted three times with 300 ml. of ethyl ether. The ether layer is then separated, dried with sodium sulfate, filtered and concentrated to about one-third its original volume. The product 3,6-dichloro-4-diallyaminopyridazine, crystallizes and has a melting point of 52°–54° C.

Hydrazine (97%, 50 ml.) and 10 g. of 3,6-dichloro-4-diallylaminopyridazine are added to a flask equipped with a stirrer and condenser. The reaction mixture is heated at reflux temperature for 3 hours, poured into 100 ml. of water and the resulting crystallite is filtered off and recrystallized from 75 ml. of ethyl ether to provide 3-chloro-4-diallyamino-6-hydrazinopyridazine; M.P. 95°–97° C.

What is claimed is:
1. A compound of the formula

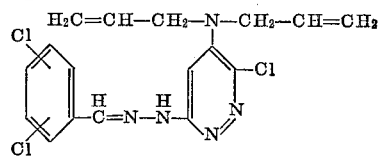

and pharmaceutically acceptable acid addition salts thereof.

2. The compound of claim 1 which is 2,6-dichlorobenzaldehyde-2-(3-chloro - 4 - diallyaminopyridazine-6-yl)-hydrazone.

References Cited

Shiho et al. Pharmaceutical Society of Japan, vol. 75, pages 776 to 778 (1955).

JOHN D. RANDOLPH, Primary Examiner

U.S. Cl. X.R.

260—250; 424—250